No. 894,487. PATENTED JULY 28, 1908.
E. G. DODGE.
PRIMARY BATTERY.
APPLICATION FILED APR. 29, 1907.
2 SHEETS—SHEET 1.
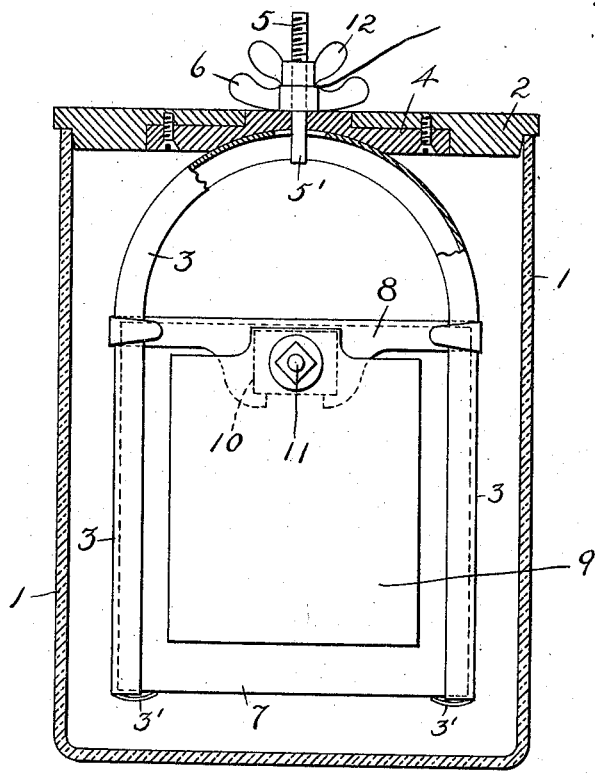
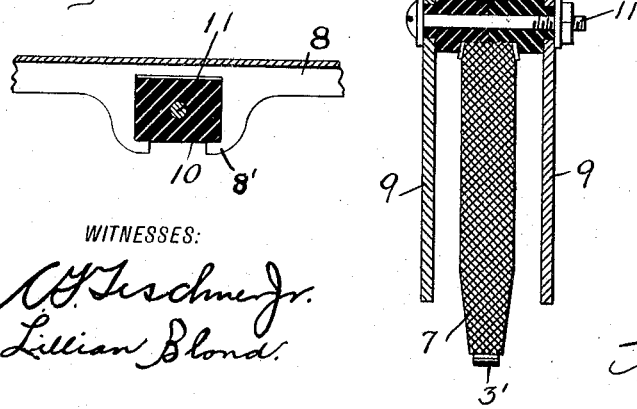
WITNESSES:
A. G. Fischmer Jr.
Lillian Blond.
INVENTOR
Eben G. Dodge
BY
Townsend & Decker
ATTORNEYS No. 894,487. PATENTED JULY 28, 1908.
E. G. DODGE.
PRIMARY BATTERY.
APPLICATION FILED APR. 29, 1907.

2 SHEETS—SHEET 2.

WITNESSES:

INVENTOR
Eben G. Dodge
BY
Townsend & Decker
ATTORNEYS

UNITED STATES PATENT OFFICE.

EBEN G. DODGE, OF NEWARK, NEW JERSEY.

PRIMARY BATTERY.

No. 894,487.  Specification of Letters Patent.  Patented July 28, 1908.

Application filed April 29, 1907. Serial No. 370,749.

*To all whom it may concern:*

Be it known that I, EBEN G. DODGE, a citizen of the United States, and a resident of Newark, in the county of Essex and State of New Jersey, have invented certain new and useful Improvements in Primary Batteries, of which the following is a specification.

My invention relates to improvements in primary or voltaic batteries of that class in which the negative electrode consists of a plate of oxid, of copper or other depolarizing agent properly molded and agglomerated, the positive electrode of which consists of a plate or plates of zinc.

The object of my invention is to simplify and cheapen the construction of batteries of the said class so that renewals of the same will be less expensive and more readily carried out.

In the previous manner of constructing these batteries it has been the custom to suspend the separate elements of the battery from the cover by independent means, the preferable way being to support the negative plate in a frame depending from the battery cover and to also suspend the positive plates from the cover by suspension devices independent of the frame. Owing to the expense of these frames it has been the custom when renewing the batteries to take out the frames, clean them and renew the parts, all taking more or less time to take the battery apart, clean the frame and renew the electrodes. I obviate this loss of time by constructing the battery so that both the electrodes are supported by one frame or hanger secured to the battery cover with but one clamp.

The expense of my improved frame being comparatively small, all that it is necessary to do when the electrodes become exhausted is to loosen the clamp, throw away the hanger with its attendant electrodes and substitute a new set in its place by clamping the new hanger to the cover.

In the preferred form of my invention I construct the frame or hanger of sheet metal preferably of the form of an inverted U, the same being suitably formed to hold one electrode, and to afford means for readily detachably securing it to the cover. To this frame or hanger I also secure the zinc plates or positive electrode of the battery by an insulating block or blocks.

My invention consists further in the details of construction and combination of parts hereinafter more particularly described and then specified in the claims.

Figure 4:
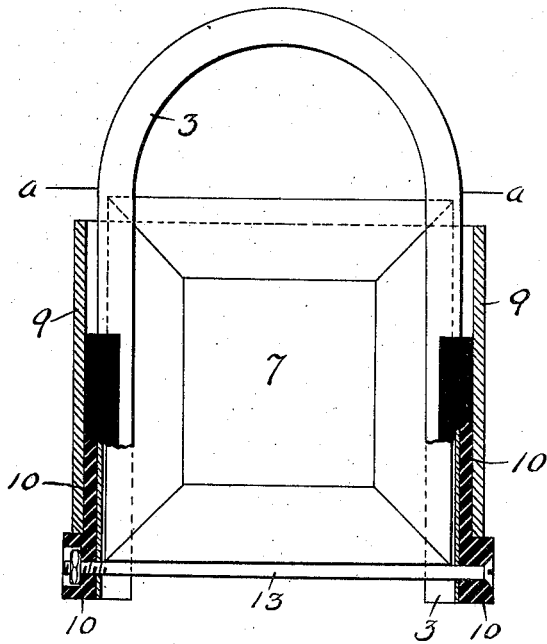
Figure 5:
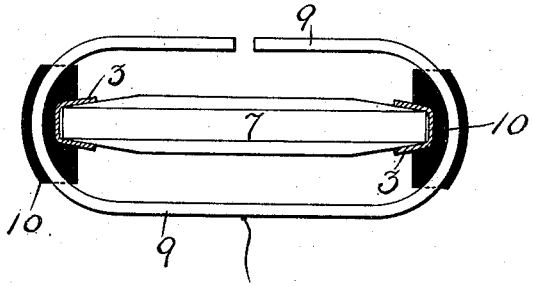
Figure 6:
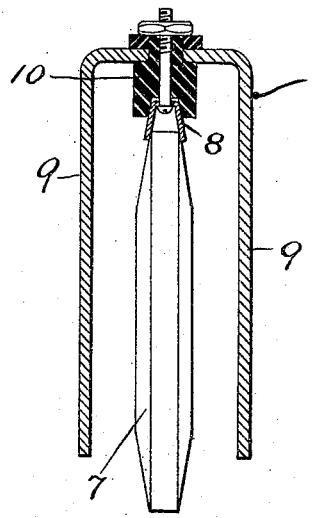

In the accompanying drawings, Figure 1 illustrates a vertical section through a battery embodying my invention, part of my invention being shown in side elevation and part in section. Fig. 2 is a transverse vertical section through the same. Fig. 3 is a longitudinal section through a detail. Fig. 4 is a side elevation and partial section of a modification in the manner of supporting the positive electrode. Fig. 5 is a horizontal section on the line $a$, $a$ Fig. 4. Fig. 6 is a vertical transverse section through an apparatus embodying a further modification in the manner of supporting the positive electrode.

1 indicates the ordinary containing jar preferably of porcelain and provided with the usual cover 2 also preferably constructed of porcelain.

3 indicates a frame or hanger preferably constructed of a strip of copper plated iron or sheet copper, the edges of said strip being turned up to such an extent as to conform to and lie flat against the bevel surface of the plate 7. The whole frame is preferably given a U shaped form. The upper part of said frame is held in a suitable groove preferably in a plate 4 countersunk in the cover 2 by means of a bolt 5 terminating in a tapered head 5' to engage the hanger or frame 3. Said tapered head 5' is adapted in one position to pass through an elongated slot in the frame 3 and when turned at a right angle to this position the tapered head engages the side members of the frame 3 so that upon tightening the thumb-nut 6, the tapered head forces the side members of the frame against the side walls of the groove in the plate 4 and locks the frame securely to the cover 2 as shown in Fig. 2. Also by means of this connection a firm contact is secured between the frame 3 and the bolt 5 which forms a binding post for one pole of the battery. I do not, however, limit myself to this particular means for clamping the frame or hanger to the cover as obviously various other methods of detachably securing the frame to the cover might be employed. Also the plate 4 might be dispensed with and the tapered groove which receives the frame 3 could be formed in the bottom of the cover proper.

7 indicates a plate preferably of copper oxid, as previously described, the edges of which fit into the channels of the hanger 3 and held in said hanger by lips 3' formed in the lower ends thereof. The plate 7 is also further clamped in the hanger 3 by a horizontal cross-piece 8 preferably of similar material and form to the hanger 3 and secured at either end to the sides of the frame or hanger.

The sides of the cross-piece 8 are provided with a depending lip 8' as shown in Fig. 3 having a rectangular opening therein coinciding with a similar opening in the plate 7.

The zinc plates or positive electrode of the battery indicated at 9 are secured to an insulating block or blocks 10 and to the cross-piece 8 by a suitable bolt 11. The blocks 10 pass through the openings in the cross-piece 8 and plate 7 and are preferably provided with shoulders or off-sets adapted to press against the sides of the cross-piece as shown in Fig. 2. It will also be seen that the bolt 11 serves to electrically connect the two zinc plates. Thus one pole of the battery is formed at the bolt 11 and a wire is attached thereto and passes through a slot in the cover 2. The other pole is obviously formed at the bolt 5 forming a binding-post by means of lock nut 12.

In the modification shown in Figs. 4 and 5 the insulating blocks 10 are secured to the sides of the hanger 3 by a horizontal tie-bolt 13, said blocks being provided each with a shoulder forming a seat for the zinc plate 9, in this case the plate preferably taking an elliptical form passing around the outside of the frame 3.

In the modification shown in Fig. 6 the positive electrode is formed of one zinc plate doubled over to pass on either side of the negative plate 7 and supported by the block 10 mounted upon the top of the cross-piece 8.

What I claim as my invention is:

1. In a voltaic battery, the combination with an inverted U shaped hanger of a copper oxid plate supported in said hanger, a cross-piece secured to the sides of said hanger and zinc plates secured to said cross-piece but insulated therefrom.

2. In a voltaic battery, the combination of a sustaining frame or hanger consisting of channeled sheet metal, a copper oxid plate supported in said channels, a cross-piece connecting the sides of said frame, a pair of zinc plates supported by said frame or hanger but insulated therefrom and means for electrically uniting said zinc plates as and for the purpose described.

3. In a voltaic battery, the combination with the electrodes thereof, of a frame or hanger depending from the battery cover and adapted to support said electrodes, means for detachably securing said hanger to the battery cover and independent means for insulating said electrodes from each other in said hanger as and for the purpose described.

4. In a voltaic battery, the combination of an inverted U shaped frame or hanger, a copper oxid plate supported in said hanger, a cross-piece connecting the arms of said hanger, a pair of zinc plates supported by said cross-piece, insulating blocks between said zinc plates and said cross-piece and a bolt passing through said insulating blocks and connecting said zinc plates, as and for the purpose described.

5. In a voltaic battery, the combination of a sustaining contact frame, a negative plate for the battery supported in said frame, a positive plate or plates for the battery supported by said frame and insulating means secured to said frame for securing said positive plate or plates thereto.

6. In a voltaic battery, the combination with the plates forming the electrodes thereof, of a cover provided with a groove in the underside thereof, a sustaining frame adapted to support said plates and means for detachably securing said frame to said groove in said cover.

7. In a voltaic battery, the combination with the plates forming the electrodes thereof, of a cover having a groove therein, a sustaining frame adapted to support said plates, and means for forcing the side members of said frame against the walls of said groove as and for the purpose described.

8. In a voltaic battery, the combination with the plates forming the electrodes thereof, of a cover provided with a groove on the under surface thereof, a sustaining frame or hanger adapted to support said plates, a tapered head adapted to engage the side members of said frame and means operating on said tapered head to force said side members of the frame against the walls of the groove as and for the purpose described.

9. In a voltaic battery, the combination of a copper oxid plate having bevel edges and a supporting contact frame provided with side members integral therewith adapted to make contact with said plate on both faces of the bevel.

Signed at New York in the county of New York and State of New York this 18th day of April A. D. 1907.

EBEN G. DODGE.

Witnesses:
C. F. TISCHNER, Jr.,
LILLIAN BLOND.